(12) United States Patent
Hirose et al.

(10) Patent No.: US 9,728,763 B2
(45) Date of Patent: Aug. 8, 2017

(54) CURRENT INTERRUPTION DEVICE AND ELECTRIC STORAGE DEVICE

(71) Applicant: KABUSHIKI KAISHA TOYOTA JIDOSHOKKI, Kariya-shi, Aichi (JP)

(72) Inventors: Takayuki Hirose, Kariya (JP); Motoaki Okuda, Kariya (JP); Hiroyasu Nishihara, Kariya (JP); Kojiro Tamaru, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/037,898

(22) PCT Filed: Nov. 10, 2014

(86) PCT No.: PCT/JP2014/079738
§ 371 (c)(1),
(2) Date: May 19, 2016

(87) PCT Pub. No.: WO2015/076137
PCT Pub. Date: May 28, 2015

(65) Prior Publication Data
US 2016/0315308 A1 Oct. 27, 2016

(30) Foreign Application Priority Data

Nov. 20, 2013 (JP) .................................. 2013-240224
Mar. 27, 2014 (JP) .................................. 2014-066405

(51) Int. Cl.
*H01M 2/34* (2006.01)
*H01M 10/0525* (2010.01)
*H01M 10/052* (2010.01)

(52) U.S. Cl.
CPC ....... *H01M 2/345* (2013.01); *H01M 10/0525* (2013.01); *H01M 10/052* (2013.01); *H01M 2200/20* (2013.01)

(58) Field of Classification Search
None
See application file for complete search history.

(56) References Cited

U.S. PATENT DOCUMENTS

| 2005/0214641 | A1 | 9/2005 | Kim |
| 2013/0196220 | A1 | 8/2013 | Okutani et al. |
| 2015/0079432 | A1 | 3/2015 | Okuda et al. |

FOREIGN PATENT DOCUMENTS

| JP | 08-115715 A | 5/1996 |
| JP | 08-185849 A | 7/1996 |

(Continued)

OTHER PUBLICATIONS

International Search Report for PCT/JP2014/079738 dated Feb. 10, 2015 [PCT/ISA/210].

(Continued)

*Primary Examiner* — Ula C Ruddock
*Assistant Examiner* — Tony Chuo
(74) *Attorney, Agent, or Firm* — Sughrue Mion, PLLC

(57) ABSTRACT

A current interruption device disclosed in the present specification includes: a first conductive member and a second conductive member that are facing each other; an insulating seal member disposed therebetween; and an insulating cover accommodating the first conductive member, the second conductive member, and the seal member. The seal member separates a space between the first and second conductive members into an inner space and an outer space which communicates with the space within the casing. In a plan view, the seal member is positioned in an entire area outside of contact portions of the seal member with the first and second conductive members within a range where the first (Continued)

and second conductive members are facing each other. The cover is disposed along outer circumferential edges of the first and second conductive members, and the seal member is in contact with the cover.

7 Claims, 7 Drawing Sheets

(56) References Cited

FOREIGN PATENT DOCUMENTS

| JP | 2005-276838 A | 10/2005 |
| JP | 2013-175428 A | 9/2013 |
| WO | 2013/125431 A1 | 8/2013 |
| WO | 2013/154166 A1 | 10/2013 |

OTHER PUBLICATIONS

Written Opinion for PCT/JP2014/079738 dated Feb. 10, 2015 [PCT/ISA/237].
Written Opinion for PCT/JP2014/079738 dated Feb. 10, 2015. [PCT/ISA/237].

CURRENT INTERRUPTION DEVICE AND ELECTRIC STORAGE DEVICE

CROSS REFERENCE TO RELATED APPLICATIONS

This application is a National Stage of International Application No. PCT/JP2014/079738 filed Nov. 10, 2014, claiming priority based on Japanese Patent Application Nos. 2013-240224 filed Nov. 20, 2013 and 2014-066405 filed Mar. 27, 2014, the contents of all of which are incorporated herein by reference in their entirety.

The technique disclosed herein relates to a current interruption device and an electric storage device using the same.

BACKGROUND ART

An electric storage device is in some cases equipped with a current interruption device that interrupts a current path connecting an electrode assembly in a casing and an external terminal provided in the casing when the electric storage device is overcharged or when a short circuit occurs in the electric storage device (see for example, Japanese Patent Application Publication No. H08-185849 (1996), and Japanese Patent Application Publication No. H08-115715 (1996)). The current interruption device includes an internal terminal plate and a conductive plate facing the internal terminal plate. An outer circumferential part of the conductive plate is connected to an external terminal plate, while a center part of the conductive plate is connected to a center part of the internal terminal plate. An outer circumferential part of the internal terminal plate is connected to the electrode assembly. When pressure within the casing rises, the conductive plate separates from the internal terminal plate to interrupt electric conduction between the conductive plate and the internal terminal plate, thereby interrupting a current flowing between the electrode assembly and the external terminal.

SUMMARY OF INVENTION

Technical Problem

In this kind of current interruption device, a large voltage is in some cases applied between the conductive plate and the internal terminal plate when the conductive plate separates from the internal terminal plate. In such a case, if electrolytic solution in the casing exists between both the conductive plate and the internal terminal plate within a range where the conductive plate and the internal terminal plate are facing each other, conductive foreign matter is generated from the electrolytic solution to form liquid-junction, which might re-conduct electricity between the conductive plate and the internal terminal plate. For this reason, in a conventional current interruption device, two seal members had been provided to prevent the electrolytic solution in the casing from entering an interspace between the conductive plate and the internal terminal plate, which lead to a complicated structure. That is, a first seal member was disposed in the interspace between the conductive plate and the internal terminal plate, and a second seal member was disposed in contact with an outer circumferential surface of the conductive plate and an outer circumferential surface of the internal terminal plate. The present disclosure provides a technique that prevents the formation of liquid-junction between two conductive members with a simple structure.

Solution to Technical Problem

A current interruption device disclosed herein is configured to interrupt a current path connecting an external terminal provided on a casing and an electrode assembly accommodated within the casing when an internal pressure of the casing rises above a predetermined level. The current interruption device comprises: a first conductive member electrically connected to the external terminal; a second conductive member disposed to face the first conductive member, and electrically connected to the electrode assembly; an insulating seal member sealing an interspace between the first conductive member and the second conductive member; and an insulating cover holding the first conductive member, the second conductive member and the seal member. The first conductive member and the second conductive member conduct electricity between each other to form part of the current path when the internal pressure of the casing is a predetermined level or below, and separate each other to interrupt the current path when the internal pressure of the casing rises above the predetermined level. The seal member comprises a first contact portion that is in contact with a vicinity of an outer circumferential edge of the first conductive member, and a second contact portion that is in contact with a vicinity of an outer circumferential edge of the second conductive member. The seal member partitions a space surrounded by the first conductive member, the second conductive member, and the cover into a first space which is inside the first contact portion and the second contact portion, and a second space which is outside the first contact portion and the second contact portion. The second space communicates with a space within the casing. In a plan view of the first conductive member, the second conductive member and the seal member, when the first contact portion and the second contact portion are positioned within a range where the first conductive member and the second conductive member are facing each other, the seal member is positioned in an entire area outside of the first contact portion and the second contact portion within the range where the first conductive member and the second conductive member are facing each other. When the first contact portion and the second contact portion are not positioned within the range where the first conductive member and the second conductive member are facing each other, the seal member is positioned outside of the range where the first conductive member and the second conductive member are facing each other. The cover is disposed along the outer circumferential edge of the first conductive member, and disposed outside of the second space. The seal member is further in contact with the cover. The term "plan view" as used herein means a view along a direction perpendicular to surfaces where the first conductive member and the second conductive member are facing each other. In other words, regarding the positional relationship between the first conductive member and the second conductive member, the term "plan view" means a view of the second conductive member from a side where the first conductive member is positioned, or a view of the first conductive member from a side where the second conductive member is positioned.

In the above-mentioned current interruption device, the space surrounded by the first conductive member, the second conductive member, and the cover is partitioned into the first space and the second space by the seal member, and the second space communicates with the space within the casing. For this reason, the electrolytic solution within the casing can possibly enter the second space. However, when the first contact portion and the second contact portion are positioned within the range where the first conductive member and the second conductive member are facing each other, the seal member is positioned in the entire area outside of the first contact portion and the second contact portion within the range where the first conductive member and the second conductive member are facing each other. Thus, the first conductive member and the second conductive member can be prevented from directly facing each other with the electrolytic solution existing between these conductive members. Due to this, the liquid-junction between the first conductive member and the second conductive member is prevented. That is, even when the electrolytic solution enters the second space, the seal member disposed as appropriate can prevent the liquid-junction between the first conductive member and the second conductive member. On the other hand, when the first contact portion and the second contact portion are not positioned within the range where the first conductive member and the second conductive member are facing each other, the seal member is positioned outside of the range where the first conductive member and the second conductive member are facing each other. That is, the electrolytic solution does not enter the range where the first conductive member and the second conductive member are facing each other, thereby preventing the liquid-junction between both of the conductive members with the electrolytic solution. Further, in this current interruption device, the electrolytic solution is allowed to enter the second space, so that two seal members do not need to be used and the liquid-junction can be prevented with a simple structure, unlike the conventional art.

Further, the seal member is in contact with the insulating cover disposed outside of the second space. The contact of the seal member with the cover partitions the second space into a plurality of spaces, thereby preventing the electrolytic solution from entering a first space side. Due to this, the liquid-junction between the first conductive member and the second conductive member can be further surely suppressed.

DESCRIPTION OF EMBODIMENTS

In a current interruption device disclosed herein, a seal member may be one member disposed along an outer circumferential part of a first conductive member or a second conductive member, and surrounding an entire periphery of the outer circumferential part. With this arrangement, since the seal member is configured of one member that surrounds the entire periphery of the outer circumferential part of the first conductive member or second conductive member, the two conductive members and the seal member can be easily assembled.

The current interruption device disclosed herein may further comprise an insulating member provided in a first space between the first conductive member and the second conductive member, and being in contact with the first conductive member and the second conductive member. With this arrangement, when the electrical conduction is interrupted, the insulating state between the first conductive member and the second conductive member can be well maintained.

In the current interruption device disclosed herein, the second conductive member may extend in an outer circumferential direction of the first conductive member, and its extending part of the second conductive member may be provided with a through-hole penetrating the second conductive member from its upper surface to its lower surface. A surface of the insulating cover that faces the second conductive member may be provided with a protrusion (boss for thermal caulking) that is inserted into the through-hole. With the cover attached to the second conductive member, a diameter of a lower end of the protrusion may be set larger than that of an opening at the upper surface of the through-hole.

In the current interruption device disclosed herein, a through-hole may be provided at the outer circumferential part of the second conductive member. The cover may comprise a caulking boss that is inserted in the through-hole of the second conductive member and fixes the cover to the second conductive member. One surface of the cover may be making contact with the casing, and another face of the cover may be making contact with a face of the second conductive member on a first conductive member side. With this arrangement, the position of the second conductive member with respect to the casing is determined only by a dimension of the cover. Due to this, a positional accuracy of the second conductive member comes to depend on only a tolerance of the dimension of the cover, and thereby can be improved. Due to this, the tolerance in designing the current interruption device can be set small, thereby reducing a size of the current interruption device.

Embodiments

Figure 1:
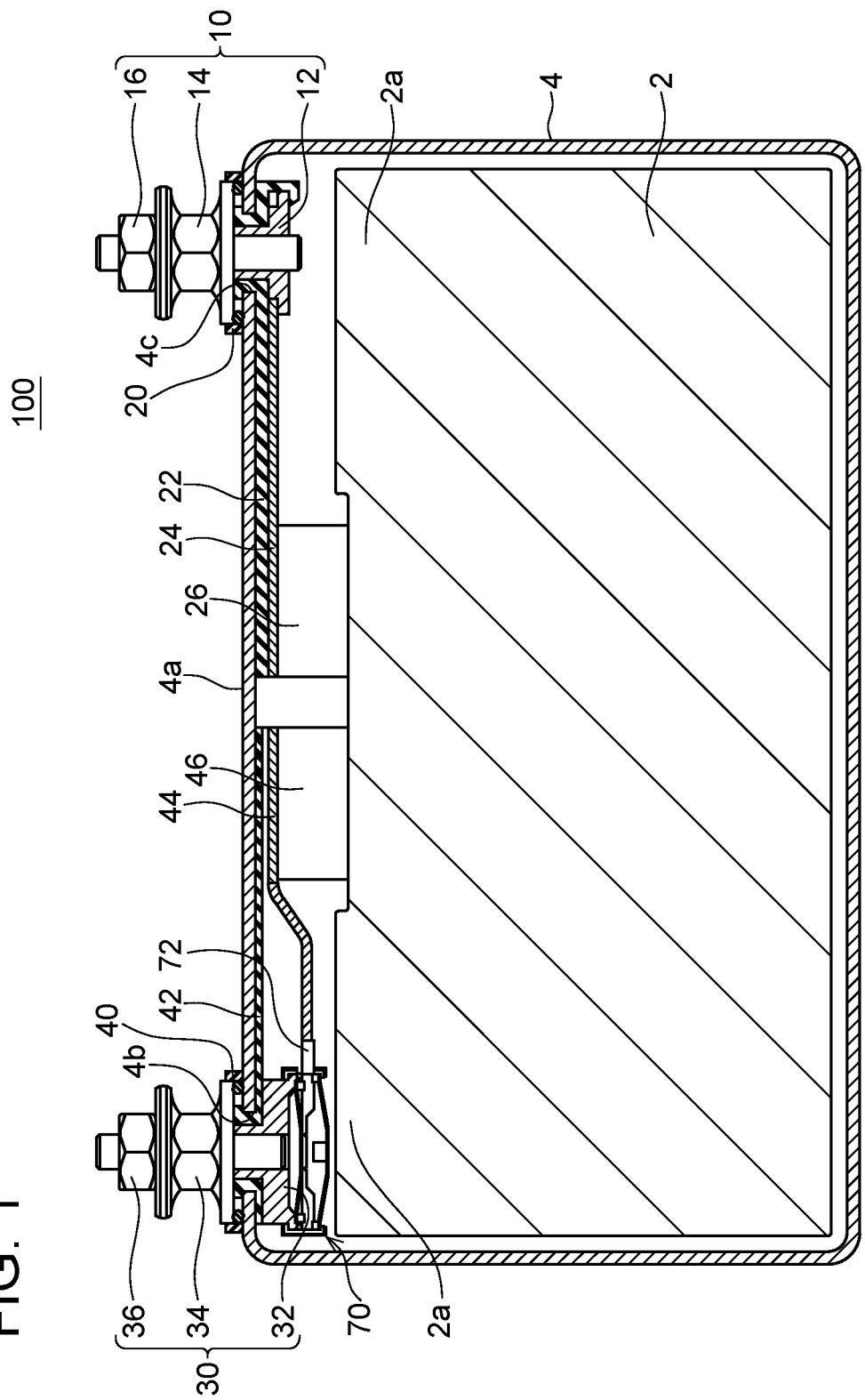
FIG. 1 is a cross-sectional view of an electric storage device.

An electric storage device 100 in a first embodiment will be described below. The electric storage device 100 is a lithium ion secondary battery, which is one type of second batteries. As shown in FIG. 1, the electric storage device 100 comprises a casing 4, an electrode assembly 2, a negative electrode terminal 30 and a positive electrode terminal 10 which serve as electrode terminals, and a current interruption device 70. The casing 4 is made of metal and has a substantially cuboid shape. The casing 4 accommodates therein the electrode assembly 2 and the current interruption device 70. Further, the casing 4 accommodates electrolytic solution therein. The negative electrode terminal 30 and the positive electrode terminal 10 are exposed at an upper surface 4a of the casing 4 to outside of the casing 4. Through-holes 4b and 4c are formed in the upper surface 4a of the casing 4. The negative electrode terminal 30 passes through the through-hole 4b, and the positive electrode terminal 10 passes through the through-hole 4c. A first insulating seal member 42 is attached to the through-hole 4b. A second insulating seal member 22 is attached to the through-hole 4c. Note that a shape of the casing 4 includes, but not limited to, for example, a cylindrical shape, a rectangular parallelepiped shape, and a sheet shape formed of a film.

The negative electrode terminal 30 includes an external nut 36, an internal nut 32, and a bolt 34. The external nut 36 is used for wire connection between the negative electrode terminal 30 and negative electrode wiring (not shown). The internal nut 32 is attached to the first seal member 42. Part of the internal nut 32 passes through the through-hole 4b. The bolt 34 is fastened to the internal nut 32. A third seal member 40 is interposed between the bolt 34 and the casing 4. The negative electrode terminal 30 is insulated from the casing 4 by the seal members 40 and 42. The internal nut 32 is electrically connected to a negative electrode lead 44 via the current interruption device 70 and a connection member 72. The negative electrode lead 44 is insulated from the casing 4 by the first seal member 42. The negative electrode terminal 30 conducts electricity with a negative electrode of the electrode assembly 2 via the current interruption device 70, the connection member 72, and the negative electrode lead 44, The current interruption device 70 will be described later.

The positive electrode terminal 10 includes an external nut 16, an internal nut 12, and a bolt 14. The external, nut 16 is used for wire connection between the positive electrode terminal 10 and positive electrode wiring (not shown). The internal nut 12 is attached to the second seal member 22. Part of the internal nut 12 passes through the through-hole 4c. The bolt 14 is fastened to the internal nut 12. A fourth seal member 20 is interposed between the bolt 14 and the casing 4. The positive electrode terminal 10 is insulated from the casing 4 by the seal members 20 and 22. A positive electrode lead 24 is fixed to the internal nut 12. The internal nut 12 and the positive electrode lead 24 are electrically connected to each other. The positive electrode lead 24 is insulated from the casing 4 by the second seal member 22. The positive electrode terminal 10 conducts electricity with a positive electrode of the electrode assembly 2 via the positive electrode lead 24.

(Electrode Assembly)

The electrode assembly 2 includes convex portions 2a protruding toward an upper surface 4a side of the casing 4. The electrode assembly 2 includes the positive electrode, the negative electrode, and a separator intervening between the positive electrode and the negative electrode. The illustration of the positive electrode, the negative electrode, and the separator will be omitted. The negative electrode has a negative electrode current collector and a negative active material layer provided over the negative electrode current collector. The negative electrode has a negative electrode current collector tab 46 at its end. No negative electrode active material layer is applied to the negative electrode current collector tab 46. The positive electrode has a positive electrode current collector and a positive electrode active material layer provided over the positive electrode current collector. The positive electrode has a positive electrode current collector tab 26 at its end. No positive electrode active material layer is applied to the positive electrode current collector tab 26. Note that material included in the active material layer (active material, binder, conductive assistant, etc.) is not specifically limited and can be well-known material for use in electrodes of electric storage devices and the like.

Here, suitable materials for the positive electrode current collector can include, for example, aluminum (Al), nickel (Ni), titanium (Ti), stainless steel, a composite material thereof, and an alloy thereof. In particular, the positive electrode current collector is preferably made of aluminum, a composite material containing aluminum, or an aluminum alloy. The positive electrode active material may be any arbitrary material which lithium ions can be inserted into and extracted from. Examples of the positive electrode active material suitable for use include $Li_2MnO_3$, $Li(NiCoMn)_{0.33}O_2$, $Li(NiMn)_{0.05}O_2$, $LiMn_2O_4$, $LiMnO_2$, $LiNiO_2$, $LiCoO_2$, $LiNi_{0.8}Co_{0.15}Al_{0.05}O_2$, $Li_2MnO_2$, $LiMn_2O_4$, etc. Further, alkali metal such as lithium and sodium, sulfur, and the like can also be used as the positive electrode active material. One kind of these materials may be used alone, or alternatively two or more kinds of these materials may be used in combination. The positive electrode active material is applied to the positive electrode current collector, together with the conductive material, the binder, and the like as appropriate.

On the other hand, suitable materials for the negative electrode current collector include aluminum, nickel, copper (Cu), etc., and a composite material thereof, an alloy thereof, and the like. In particular, the negative electrode current collector is preferably made of copper, a composite material containing copper, or a copper alloy. The negative electrode active material may be any arbitrary material which lithium ions can be inserted into and extracted from. Examples of the negative electrode active material suitable for use can include alkali metals such as lithium (Li) and sodium (Na), transition metal oxides containing alkali metal, carbon materials such as natural carbon, mesocarbon microbeads, highly oriented graphite, hard carbon, and soft carbon, an elemental silicon, a silicon-containing alloy, and a silicon-containing oxide. The negative electrode active material is applied to the negative electrode current collector, together with the conductive material, the binder, and the like as appropriate.

The separator can use a porous material having insulation properties. Examples of the separator suitable for use can include a porous film made of polyolefin-based resin such as polyethylene (PE) and polypropylene (PP), and a woven fabric or non-woven fabric made of polypropylene, polyethylene terephthalate (PET), methyl cellulose, etc.

The electrolytic solution is preferably a non-aqueous electrolyte solution that is obtained by dissolving a supporting salt (electrolyte) in a non-aqueous solvent. Examples of the non-aqueous solvent suitable for use can include solvents containing aliphatic esters such as ethylene carbonate (EC), propylene carbonate (PC), dimethyl carbonate (DMC), diethyl carbonate (DEC), and ethyl methyl carbonate (EMC), solvents of ethyl acetate, methyl propionate, etc., and a mixture thereof. The supporting salt (electrolyte) suitable for use can include, for example, $LiPF_6$, $LiBF_4$, $LiAsF_6$, and the like.

(Current Interruption Device)

Figure 2A:
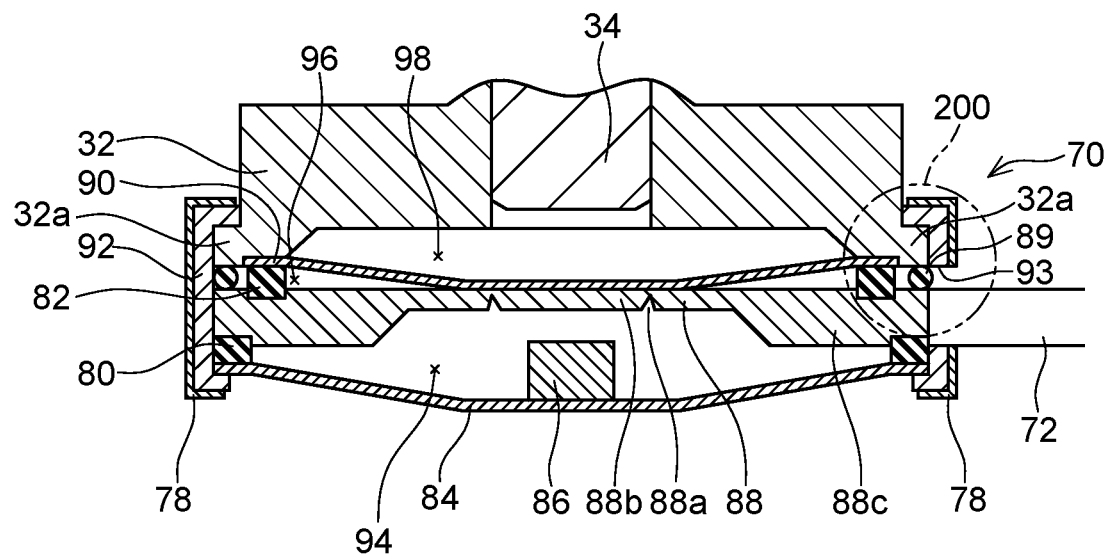
FIG. 2A is a diagram showing a current interruption device when a terminal and an electrode conduct electricity between each other.
Figure 2B:
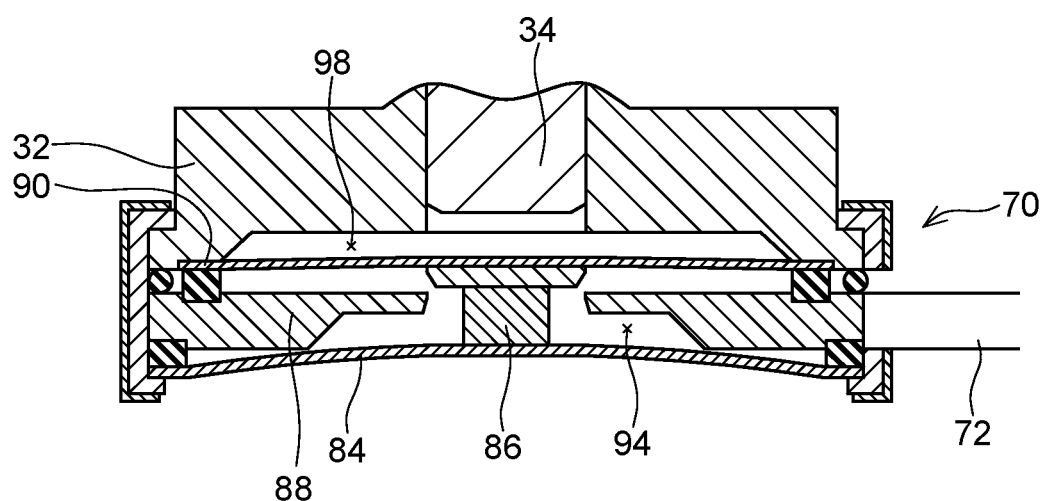
FIG. 2B is a diagram showing the current interruption device when the terminal and the electrode do not conduct electricity between each other.

Referring to FIGS. 2A and 2B, the current interruption device 70 will be described. The current interruption device 70 is connected between the negative electrode terminal 30 and the negative electrode current collector tab (negative electrode) 46. The current interruption device 70 may be connected to between the positive electrode and the positive electrode terminal 10. Alternatively, current interruption devices 70 may be connected to both between the negative electrode and the negative electrode terminal 30 and between the positive electrode and the positive electrode terminal 10. Note that FIGS. 2A and 2B omit the illustration of the seal member 42 intervening between the negative electrode terminal 30 and the casing 4.

As shown in FIG. 2A, the current interruption device 70 includes a first inverting plate 84 made of metal, a rupture plate 88 made of metal, a second inverting plate 90 made of metal, and a support member (cover) 92 having insulation properties. The support member 92 supports (holds) the first inverting plate 84, the rupture plate 88, and the second inverting plate 90. That is, the support member 92 is engaged externally with the first inverting plate 84, the rupture plate 88, and the second inverting plate 90, and supports a stacked state of the first inverting plate 84, the rupture plate 88, and the second inverting plate 90. A plate 78 made of metal is attached to an outer circumferential surface of the support member 92. Specifically, the plate 78 is caulked to the outer circumferential surface of the support member 92 while the support member 92 sandwiches the first inverting plate 84, the rupture plate 88, the second inverting plate 90, and a lower end 32a of the internal nut 32 along up and down directions. Thus, the current interruption device 70 is attached to the internal nut 32. In other words, the first inverting plate 84, the rupture plate 88, the second inverting plate 90, and the lower end 32a of the internal nut 32 are accommodated in the support member 92. That is, the members accommodated in the support member 92 are elements that configure the current interruption device 70. Note that an opening 93 is arranged at a part in a circumferential direction of the outer circumferential surfaces of the support member 92 and the plate 78. The opening 93 communicates with a space within the casing 4, and the connection member 72 is disposed in the opening 93. Thus, the negative electrode lead 44 and the rupture plate 88 disposed inside the support member 92 and the plate 78 are connected to each other via the connection member 72.

The first inverting plate 84 is a circular plate and disposed under the rupture plate 88. A lower surface of an outer circumferential edge of the first inverting plate 84 has its entire periphery supported by the support member 92. An insulating member 80 is disposed at an upper surface of an outer circumferential edge of the first inverting plate 84. The insulating member 80 is a ring-shaped member and serves to insulate the first inverting plate 84 from the rupture plate 88. A protrusion 86 is provided at an upper surface of the first inverting plate 84, and the protrusion 86 is positioned at a center of the first inverting plate 84. The protrusion 86 protrudes upward toward the rupture plate 88. In the state shown in FIG. 2A, an interspace is formed between the protrusion 86 and a center part 88b of the rupture plate 88. Note that pressure of the space within the casing 4 acts on a lower surface of the first inverting plate 84, while pressure of a space 94 between the first inverting plate 84 and the rupture plate 88 acts on the upper surface of the first inverting plate 84. Since the space 94 and the space within the casing 4 are separately sealed, once the pressure of the space within the casing 4 becomes high, pressure acting on the upper surface of the first inverting plate 84 becomes different from that acting on the lower surface of the first inverting plate 84.

The rupture plate 88 is a circular plate and disposed between the first inverting plate 84 and the second inverting plate 90. The connection member 72 is connected to part of an outer circumferential part of the rupture plate 88. A groove 88a is formed at a center of the lower surface of the rupture plate 88. The groove 88a is provided in a circular shape as viewed from its bottom surface. As shown in FIG. 2A, the cross-section of the groove 88a is triangle with a convex-upward shape. The provision of the groove 88a lowers a mechanical strength of the part of the rupture plate 88 provided with the groove 88a, compared to a mechanical strength of a rest of the rupture plate 88 except for the groove 88a. The rupture plate 88 is partitioned by the groove 88a into the center part 88b surrounded by the groove 88a and an outer circumferential part 88c positioned on an outer periphery side of the groove 88a. A plate thickness of the center part 88b is thin, while a plate thickness of the outer circumferential part 88c is thick.

The second inverting plate 90 is a circular plate and disposed above the rupture plate 88. A center part of the second inverting plate 90 has a convex-downward shape in the state shown in FIG. 2A and is fixed to the center part 88b of the rupture plate 88. An outer circumferential part of the second inverting plate 90 is electrically connected to the internal nut 32, Therefore, the negative electrode terminal 30 is connected to the electrode assembly 2 via the second inverting plate 90, the rupture plate 88, the connection member 72, and the negative electrode lead 44. A space 98 is formed between an upper surface of the second inverting plate 90 and a lower surface of the internal nut 32. The space 98 is sealed from the space within the casing 4. An insulating member 82 is disposed between the second inverting plate 90 and the rupture plate 88. The insulating member 82 is a ring-shaped member and is in contact with the outer circumferential part of the second inverting plate 90 and the outer circumferential part of the rupture plate 88, thereby insulating both plates from each other.

Here, in this embodiment, further, a seal member 89 is disposed between the rupture plate 88 and the outer circumferential part (lower end 32a) of the internal nut 32. The seal member 89 is a ring-shaped member having a circular cross-section and disposed outside of the insulating member 82. The seal member 89 is in contact with a lower surface of the lower end 32a of the internal nut 32 as well as an upper surface of the rupture plate 88, and surrounds entire peripheries of the outer circumferential parts of the internal nut 32 and the rupture plate 88. The seal member 89 seals an interspace between the internal nut 32 and the rupture plate 88. Therefore, a space positioned under the second inverting plate 90 and the internal nut and above the rupture plate 88 is separated by the seal member 89 into a space 96 inside the seal member 89 and an outer space 63 (see FIG. 3). Due to this, it can be said that the insulating member 82 is disposed in the space 96 positioned on an inner side of the seal member 89. As mentioned above, the space 63 positioned on an outer side of the seal member 89 communicates with the space within the casing 4 via the opening 93 formed in the support member 92 and the plate 78. On the other hand, the space 96 is sealed from the space 63 by the seal member 89 and thereby does not communicate with the space within the casing 4.

Figure 3:
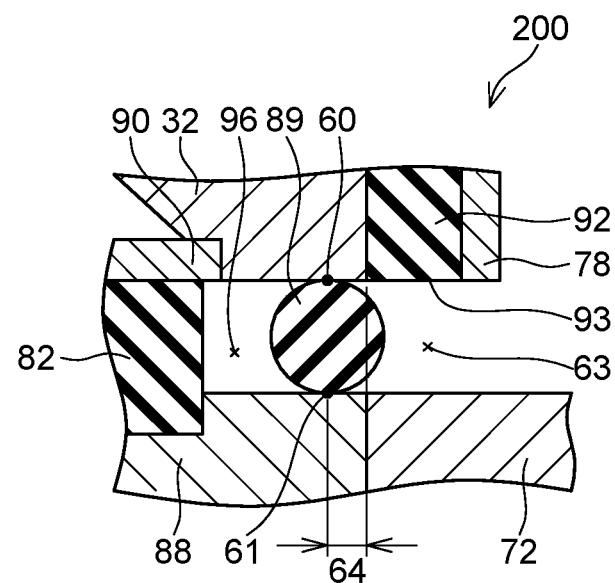
FIG. 3 is an enlarged diagram of a part 200 enclosed by a dotted line of FIG. 2A.

As shown in FIG. 3, the seal member 89 is compressed between the internal nut 32 and the rupture plate 88. The internal nut 32 is in contact with a first contact portion 60 of the seal member 89. The rupture plate 88 is in contact with a second contact portion 61 of the seal member 89. As can be seen from FIG. 3, in the plan view of the current interruption device 70, the seal member 89 exists across an entirety of a region 64 located outside of the first contact portion 60 and the second contact portion 61 in a range where the internal nut 32 and the rupture plate 88 are facing each other. That is, the seal member 89 protrudes outward across its entire area in the circumferential direction than an outer circumferential edge of the internal nut 32 and an outer circumferential edge of the rupture plate 88. Thus, in the region 64 located outside of the first contact portion 60 and the second contact portion 61, the internal nut 32 and the rupture plate 88 do not face each other directly; the lower surface of the internal nut 32 faces an upper surface of the seal member 89, while the upper surface of the rupture plate 88 faces a lower surface of the seal member 89.

In the above-mentioned electric storage device 100, in the state shown in FIG. 2A, the negative electrode terminal 30 and the negative electrode current collector tab 46 (negative electrode) conduct electricity between each other, while the positive electrode terminal 10 and the positive electrode current collector tab 26 (positive electrode) conduct electricity between each other. Thus, the negative electrode terminal 30 and the positive electrode terminal 10 conduct electricity therebetween. When an internal pressure of the casing 4 rises above a predetermined level, as shown in FIG. 2B, the rupture plate 88 is broken at the groove 88a, thus interrupting the electrical conduction between the outer circumferential part 88c of the rupture plate 88 and the second inverting plate 90 (internal nut 32). That is, when the internal pressure of the casing 4 rises, pressure acting on the lower surface of the first inverting plate 84 is increased (which is the state shown in FIG. 2A). Pressure acting on the upper surface of the first inverting plate 84 (that is, the pressure in the space 94) does not change without being affected by the rise in pressure within the casing 4. Thus, when the internal pressure of the casing 4 rises above the predetermined level, the first inverting plate 84 is inverted to change its shape from the convex-downward state to the convex-upward state. When the first inverting plate 84 is inverted, the protrusion 86 of the first inverting plate 84 collides with the center part 88b of the rupture plate 88, thereby breaking the rupture plate 88 at the groove 88a. Then, the second inverting plate 90 is also inverted depending on the displacement of the first inverting plate 84, which causes the second inverting plate 90, the center part of the rupture plate 88, and the first inverting plate 84 to be displaced upward (in the state shown in FIG. 2B). Due to this, the current path connecting the rupture plate 88 to the second inverting plate is interrupted, thereby interrupting the electrical conduction between the electrode assembly 2 and the negative electrode terminal 30.

Even when the rupture plate 88 has been broken at the groove 88a (in the state shown in FIG. 2B), the negative electrode terminal 30 is connected to an external device, and the rupture plate 88 is still connected to the negative electrode of the electrode assembly 2. Due to this, a large voltage may be in some cases applied between the negative electrode terminal 30 (that is, the internal nut 32) and the rupture plate 88. The space 63 communicates with the space within the casing 4, whereby the electrolytic solution may possibly invade the inside of the space 63. However, in the current interruption device 70 of this embodiment, the seal member 89 exists across the entirety of the region 64 located outside of the first contact portion 60 and the second contact portion 61 in the range where the internal nut 32 and the rupture plate 88 are facing each other. Thus, even if the large voltage is applied between the internal nut 32 and the rupture plate 88, the electrolytic solution can be prevented from generating conductive foreign matter. As a result, the electrical re-conduction between the internal nut 32 and the rupture plate 88 can be prevented from occurring due to the liquid junction between the internal nut 32 and the rupture plate 88.

Note that in the above-mentioned current interruption device 70, the seal member 89 prevents the liquid-junction between the internal nut 32 and the rupture plate 88 and further seals the interspace between the internal nut 32 and the rupture plate 88. Thus, the seal member 89 as a single member ran exhibit a plurality of functions (liquid-junction preventing function, and sealing function), which can simplify the structure of the current interruption device 70.

Finally, correspondence between the embodiments described above and claims will be described. The lower end 32a of the internal nut 32 and the second inverting plate 90 are one example of the "first conductive member"; the rupture plate 88 is one example of the "second conductive member"; the space 96 is one example of the "first space"; the space 63 is one example of the "second space"; and the support member 92 is one example of the "cover".

Although in the embodiments described above, the seal member 89 is in contact with only two members, namely, the internal nut 32 and the rupture plate 88, the invention is not limited to this structure. For example, in an example shown in FIG. 4, the seal member 89 is in contact with a support member 92a at a third contact portion 65, in addition to the internal nut 32 and the rupture plate 88. Thus, the seal member 89 is in contact with the internal nut 32, the rupture plate 88, and the support member 92a in three positions, namely, the first contact portion 60, the second contact portion 61, and the third contact portion 65. Thus, the space enclosed by the second inverting plate 90, the internal nut 32, the rupture plate 88, and the support member 92a is partitioned into the first space 96 and the second space 63 by the first contact portion 60 and the second contact portion 61 of the seal member 89. Further, the second space 63 is partitioned by the third contact portion 65 of the seal member 89 into a space 631 on a first contact portion 60 side and a space 632 on a second contact portion side. Thus, since the electrolytic solution entering the space 632 is prevented from invading the space 631 by the third contact portion 65, the liquid-junction between the internal nut 32 and the rupture plate 88 can be surely prevented.

In the embodiments described above, the lower surface of the internal nut 32 faces the upper surface of the rupture plate 88. In positions where these surfaces are placed in parallel with each other, the seal member 89 is in contact with the respective surfaces. However, the invention is not limited to this structure. For example, in an example shown in FIG. 5, a tapered portion 66 is provided at an outer circumferential corner of a surface of the lower end 32a of the internal nut 32 on a rupture plate 88 side (at a corner formed by a surface facing the rupture plate 88 and the outer peripheral surface of the lower end 32a of the internal nut 32). The seal member 89 is disposed to be in contact with the tapered portion 66 of the lower end 32a of the internal nut 32. The seal member 89 is in contact with the tapered portion 66 at a first contact portion 60a. Furthermore, the seal member 89 is in contact with the rupture plate 88 at a second contact portion 61a, as well as with the support member 92a at the third contact portion 65. When the pressure within the casing rises to apply external force 67 directed toward the first space 96 to the seal member 89, the external force can be received by the tapered portion 66. Due to this, forces acting on the seal member 89 are kept in balance, and appropriate positional relationship among the seal member 89, the lower end 32a of the internal nut 32, and the rupture plate 88 is maintained. Accordingly, the liquid junction preventing function by the seal member 89 can be prevented from being degraded.

Figure 4:
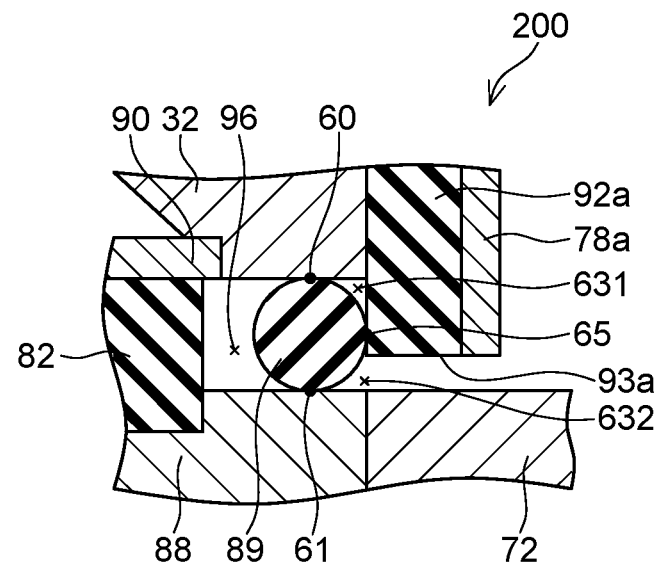
FIG. 4 is a diagram showing another example of a seal structure of preventing liquid-junction.
Figure 5:
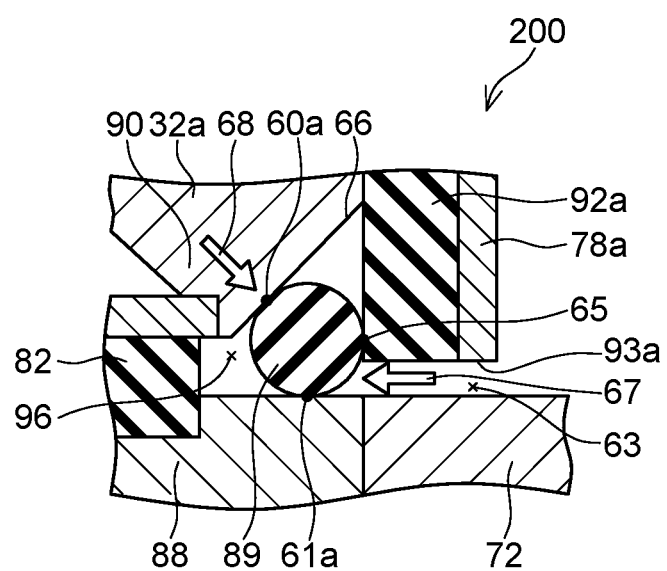
FIG. 5 is a diagram showing a further example of the seal structure of preventing liquid-junction.

In the examples shown in FIGS. 4 and 5, the same components as those in the embodiment shown in FIG. 1 are denoted by the same reference numerals. However, some components with partly different structures from those in the embodiment shown in FIG. 1 are denoted by the same reference numerals with an additional alphabet letter "a".

Figure 6:
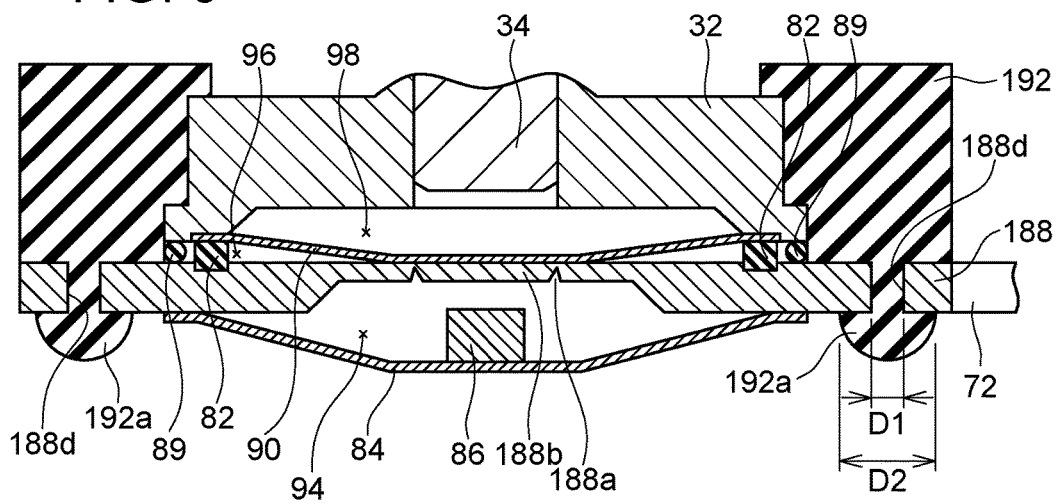
FIG. 6 is a diagram showing another example of a support (cover) included in the current interruption device.
Figure 7:
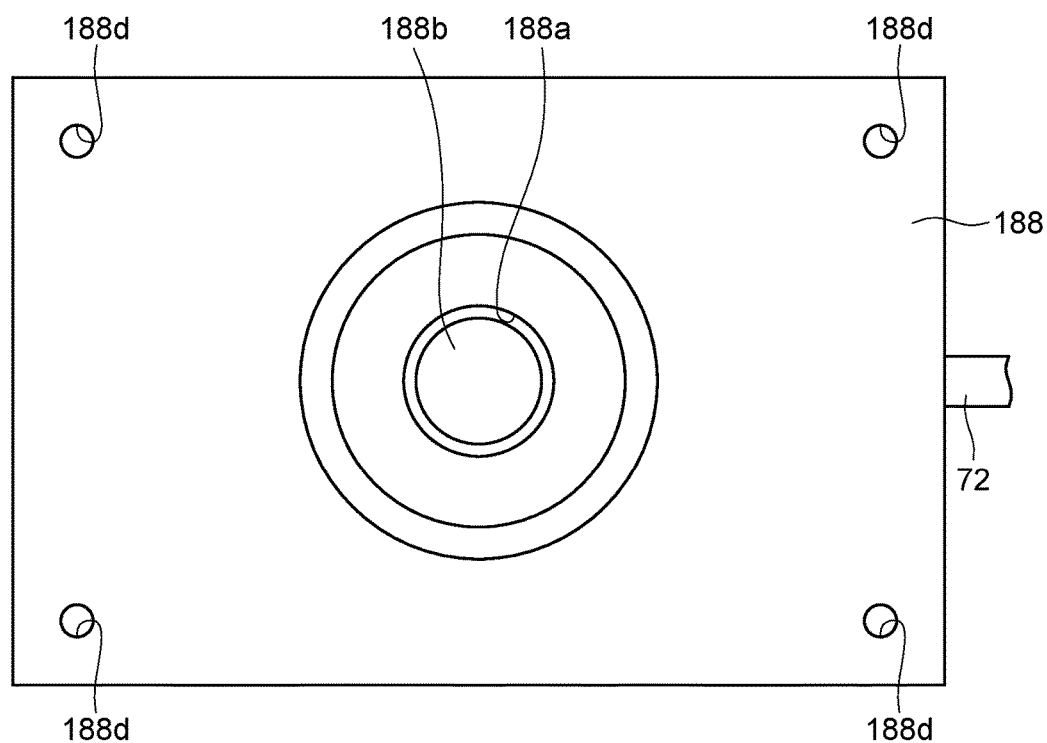
FIG. 7 is a plan view of a rupture plate corresponding to the other example of the support (cover) included in the current interruption device.

In the above embodiments, the plate 78 is caulked to the outer circumferential surface of the support member 92a, thereby attaching the respective components of the current interruption device 70 to the internal nut 32. However, the support member is not limited to this structure. For example, in an example shown in FIG. 6, a support member 192 is made of thermoplastic resin and attached directly to a rupture plate 188 using the thermoplasticity thereof. That is, the rupture plate 188 extends in the outer circumferential direction of the internal nut 32, and attachment holes 188d are provided in positions to which the rupture plate 188 extends. Each attachment hole 188d has a circular cross-sectional shape with a diameter D. As illustrated in FIG. 7, the attachment holes 188d are provided at four corners of the rupture plate 188. Protrusions (bosses for thermal caulking) 192a are provided at the lower surface of the support member 192 in positions corresponding to the attachment holes 188d. Each protrusion 192a is formed to have a small diameter than a diameter D1 of an opening before being inserted into the corresponding attachment hole 188d. After inserting the protrusions 192a into the attachment holes 188d, heat is applied to the lower ends of the protrusions 192a by a use of a thermal caulking tool. Each protrusion 192a is deformed because of its thermoplasticity along a shape of the attachment hole 188d, and simultaneously the lower end of the protrusion 192a is deformed along a shape of the thermal caulking tool to have its diameter increased to a diameter D2 (>D1). Since the diameter D2 of the lower end of the protrusion 192a is larger than the diameter D1 of the cross-section of the attachment hole 188d, the protrusion 192a will never come out from the corresponding attachment hole 188d. Moreover, since contraction force is generated inside the protrusions 192a due to its thermal deformation, the rupture plate 188 undergoes a force toward a side where the support member 192 is disposed. Due to this, the support member 192 is strongly fixed to the rupture plate 188. As shown in FIG. 6, the support member 192 covers an outer circumferential end part of the upper surface of the internal nut 32. Thus, the internal nut 32, the second inverting plate 90, the insulating member 82, and the seal member 89 are sandwiched and supported (held) by the support member 192 and the rupture plate 188 along up and down directions. Note that in the example shown in FIG. 6, the first inverting plate 84 is fixed to a lower surface of the rupture plate 188 by welding. With this arrangement, the plate 78 used in the above-mentioned embodiment is no longer required, which can decrease a number of parts. Although in the above-mentioned embodiment, the support member 192 and the rupture plate 188 are fixed together using the thermal caulking, the fixing between the support member and the rupture plate is not limited to the thermal caulking. That is, any fixing means may be used as long as it can fix the support member and the rupture plate together by melting the bosses provided in the support member and deforming and solidifying the melted bosses. Thus, in place of the thermal caulking, ultrasonic caulking and the like may be used.

Figure 8:
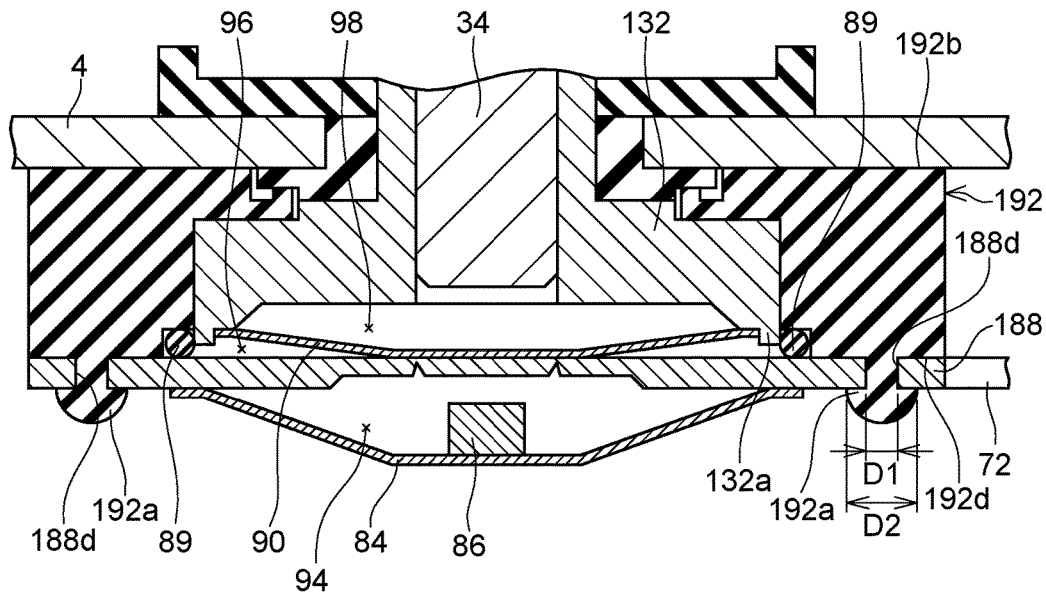
FIG. 8 is a diagram showing another example of a current interruption device (when conducting electricity)
Figure 9:
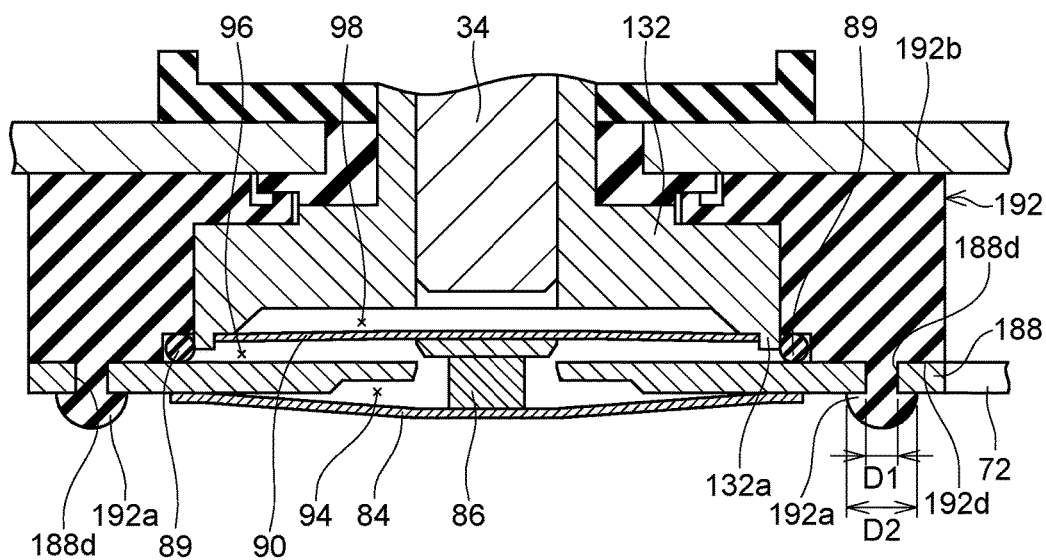
FIG. 9 is a diagram showing a state of interrupting the electrical conduction in the current interruption device shown in FIG. 8.
Figure 10:
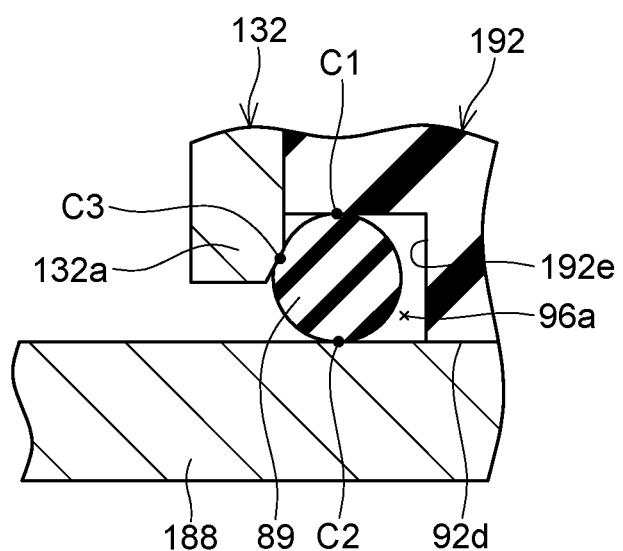
FIG. 10 is an enlarged diagram of a seal structure in the current interruption device shown in FIG. 8.

Although in each of the above-mentioned embodiments, the seal member 89 is disposed between the internal nut 32 and the rupture plate 88, the seal member is not limited to this structure. For example, like the current interruption devices shown in FIGS. 8 to 10, the seal member 89 may be disposed outside of an internal nut 132. That is, also in the current interruption devices illustrated in FIGS. 8 to 10, the seal member 89 is disposed in the space 96 enclosed by the second inverting plate 90, the rupture plate 188, and the support member 192. As shown in FIG. 10, the seal member 89 is accommodated in a cutout portion 192e formed at a lower surface 192d of the support member 192. That is, the seal member 89 is accommodated in a space disposed outside of the internal nut 132 and formed by the cutout portion 192e and the rupture plate 188. A protrusion 132a is arranged at a lower end of an outer circumferential part of the internal nut 132 so as to protrude toward the rupture plate 88. The protrusion 132a partly closes an opening of the space formed by the cutout portion 192e and the rupture plate 188. That is, an interspace is formed between the protrusion 132a and the rupture plate 188 to ensure the insulation between the internal nut 132 and the rupture plate 188.

As illustrated in FIG. 10, the seal member 89 is in contact with the support member 192 at a seal position C1, as well as in contact with the rupture plate 188 at a seal position C2, and further in contact with the protrusion 132a of the internal nut 132 at a seal position C3. That is, the seal member 89 hermetically seals the space 96 and the space within the casing 4 at the three points C1, C2, and C3. The protrusion 132a of the internal nut 132 is positioned inside the seal member 89, and a surface on an inner circumferential side of the seal member 89 is in contact with the protrusion 132a. As can be seen from FIGS. 8 to 10, the insulating member 82 is not disposed inside the seal member 89 and between the rupture plate 188 and the second inverting plate 90. Due to this, the number of parts can be reduced.

Even in the above-mentioned current interruption device, the seal member 89 is in contact with each of the support member 192, the rupture plate 188, and the internal nut 132 (that is, seals at three positions) to prevent the liquid-junction due to the invasion of the electrolytic solution. In this current interruption device, an upper surface 192b of the support member 192 is in contact with the casing 4, while the lower surface 192d of the support member 192 is in contact with the rupture plate 188. Thus, the internal nut 132, the second inverting plate 90, and the rupture plate 188 are positioned only by the support member 192 with respect to the casing 4. Since there is no plurality of members for positioning these members 132, 90, and 188, and the member for positioning them is only the support member 192, the positioning accuracy of these members 132, 90, and 188 can be improved. As a result, tolerances of these members 132, 90, and 188 can be set small, contributing to reducing the size of the current interruption device 70.

The cross-sectional shape of the seal member 89 provided in the above-mentioned embodiments is not limited to a perfect circular shape as shown in the figures. For example, the cross-sectional shape of the seal member may be elliptical or polygonal. Although in the above-mentioned embodiments, the connection member 72 and the rupture plate 88 are provided as separate members, the connection member 72 and the rupture plate 88 may be integrally formed. In this case, the integrated member corresponds to the second conductive member.

Although in the above-mentioned embodiments the current interruption device 70 includes the two inverting plates 84 and 90, the structure of the current interruption device is not limited to the structures in these embodiments. For example, the current interruption device may be configured of one inverting plate and one rupture plate. That is, like the current interruption device shown in FIG. 2A, the rupture plate and the inverting plate (corresponding to the second inverting plate) are provided to allow the pressure within the casing to be applied to the inverting plate. In this current interruption device, the internal pressure of the casing acts on a lower surface of the inverting plate. Once a difference between pressure acting on an upper surface of the inverting plate and the pressure acting on the lower surface thereof rises above the predetermined level, the inverting plate is inverted to break the rupture plate. Even in such a current interruption device, like the embodiment shown in FIG. 1, a seal member is disposed between the outer circumferential part of the rupture plate and the outer circumferential part of the inverting plate (outer circumferential part of the internal nut), thereby enabling the prevention of the liquid-junction between the inverting plate and the rupture plate.

Specific examples of the present invention have been described in detail, however, these are mere exemplary indications and thus do not limit the scope of the claims. The art described in the claims includes modifications and variations of the specific examples presented above. For example, for the first inverting plate and the second inverting plate, any arbitrary structures may be used and not be limited to the structure that is "inverted" as long as it deforms in response to receive pressure. Further, technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A current interruption device configured to interrupt a current path connecting an external terminal provided on a casing and an electrode assembly accommodated within the casing when an internal pressure of the casing rises above a predetermined level, the current interruption device comprising:
   a first conductive member electrically connected to the external terminal;
   a second conductive member disposed to face the first conductive member, and electrically connected to the electrode assembly;
   an insulating seal member sealing an interspace between the first conductive member and the second conductive member; and
   an insulating cover holding the first conductive member, the second conductive member and the seal member, wherein
   the first conductive member and the second conductive member conduct electricity between each other to form part of the current path when the internal pressure of the casing is a predetermined level or below, and separate each other to interrupt the current path when the internal pressure of the casing rises above the predetermined level,
   the seal member comprises a first contact portion that is in contact with a vicinity of an outer circumferential edge of the first conductive member and a second contact portion that is in contact with a vicinity of an outer circumferential edge of the second conductive member, and the seal member partitions a space surrounded by the first conductive member, the second conductive member and the cover into a first space which is inside the first contact portion and the second contact portion and a second space which is outside the first contact portion and the second contact portion,
   the second space communicates with a space within the casing,
   the first space is sealed from the space within the casing by the seal member,
   in a plan view of the first conductive member, the second conductive member and the seal member, when the first contact portion and the second contact portion are positioned within a range where the first conductive member and the second conductive member are facing each other, the seal member is positioned in an entire area outside of the first contact portion and the second contact portion within the range where the first conductive member and the second conductive member are facing each other, and when the first contact portion and the second contact portion are not positioned within the range where the first conductive member and the second conductive member are facing each other, the seal member is positioned outside of the range where the first conductive member and the second conductive member are facing each other, and
   the cover is disposed along the outer circumferential edge of the first conductive member, and disposed outside of the second space, and the seal member is further in contact with the cover.

2. The current interruption device according to claim 1, wherein the seal member is one member disposed along an outer circumferential part of the first conductive member or the second conductive member, and surrounding an entire periphery of the outer circumferential part.

3. The current interruption device according to claim 2, further comprising
   an insulating member provided in the first space between the first conductive member and the second conductive member, and being in contact with the first conductive member and the second conductive member.

4. The current interruption device according to claim 2, wherein a through-hole is provided at an outer circumferential part of the second conductive member,
   the cover comprises a caulking boss that is inserted in the through-hole of the second conductive member and fixes the cover to the second conductive member,
   one face of the cover is making contact with the casing, and another face of the cover is making contact with a face of the second conductive member on a first conductive member side.

5. An electric storage device comprising:
   a casing;
   an external terminal provided on the casing;
   an electrode assembly disposed within the casing; and
   a current interruption device according to claim 1.

6. The current interruption device according to claim 1, further comprising
   an insulating member provided in the first space between the first conductive member and the second conductive member, and being in contact with the first conductive member and the second conductive member.

7. The current interruption device according to claim 1, wherein a through-hole is provided at an outer circumferential part of the second conductive member, the cover comprises a caulking boss that is inserted in the through-hole of the second conductive member and fixes the cover to the second conductive member,
one face of the cover is making contact with the casing, and another face of the cover is making contact with a face of the second conductive member on a first conductive member side.

\* \* \* \* \*